July 24, 1951   J. H. GODFREY ET AL   2,562,143
ROUTER
Filed March 16, 1948
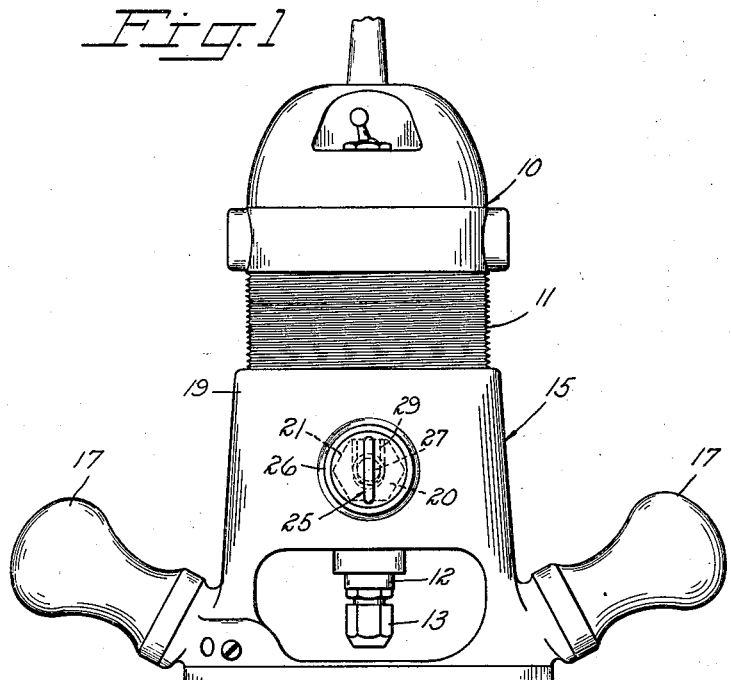
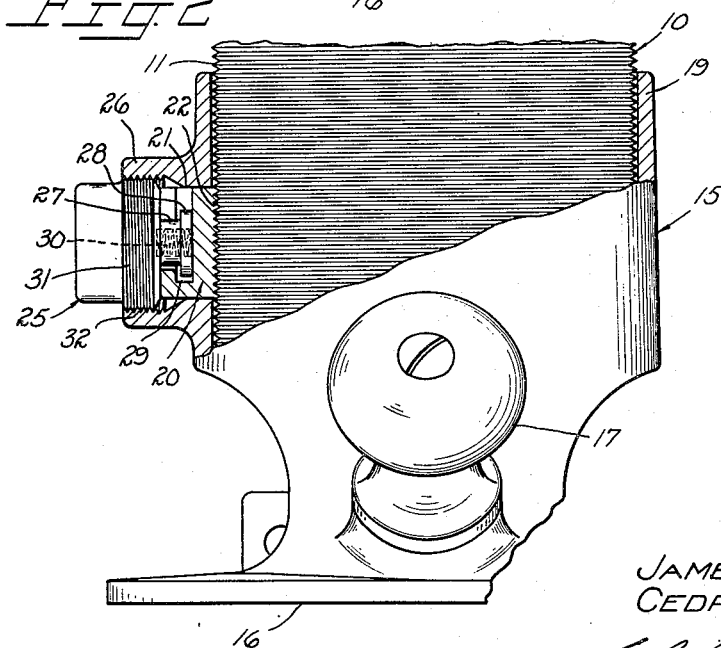
Inventors
JAMES H. GODFREY
CEDRIC POWERS
By T. C. Ray Lindsey
Attorney Patented July 24, 1951

2,562,143

UNITED STATES PATENT OFFICE 2,562,143

ROUTER

James H. Godfrey, Berlin, and Cedric Powers, New Britain, Conn., assignors to The Stanley Works, New Britain, Conn., a corporation of Connecticut Application March 16, 1948, Serial No. 15,074

6 Claims. (Cl. 248—23)

The present invention relates generally to routers and, more particularly, to a novel and improved arrangement for adjustably positioning the motor unit of the router in the base of the router. The invention is particularly applied to routers in which the motor having a shaft to which the cutting tool is affixed is vertically positioned in a portable base for positioning and guiding the cutting tool, such base having a flat under surface which engages and may be moved over a surface of the work during a cutting operation.

It is an object of the present invention to provide an improved arrangement for positioning the motor unit in the base such that concentricity and accuracy will be maintained at all times, this being especially important in templet work.

A further object of the invention is to provide such a positioning arrangement which will be quick and accurate in use combining precise adjustment of the motor in the base with instantaneous full release or locking of the motor in the base, as desired. Included in this object is the aim to provide an arrangement which can be manually manipulated in a minimum time and with a minimum of effort whereby the utility of the router is enhanced.

Another object of the invention is to provide such an arrangement which is foolproof in operation, which is simple and economical to fabricate, which requires a minimum of parts, which is of rugged and durable construction, and which will give improved service over long periods of time without likelihood of malfunctioning or breakdown.

Other objects will be in part obvious and in part pointed out more in detail hereinafter.

The invention accordingly consists in the features of construction, combination of elements and arrangement of parts which will be exemplified in the construction hereafter set forth and the scope of the application of which will be indicated in the appended claims.

In the drawing:

Figure 1 is a side view of an assembled router embodying the present invention; and Fig. 2 is an enlarged fragmentary side view partially cut away to show details of construction and with the base of the router turned 90° from the position shown in Fig. 1.

Referring to the drawing, the router comprises a motor unit 10 having a threaded cylindrical sleeve or casing 11 secured to the motor unit body. The motor 10 is a conventional high speed electric motor having a central and vertically disposed shaft 12 provided with chuck means 13 at its lower end for receiving a cutting tool (not shown) of any desired form, as for profiling, grooving, etc.

The motor unit 10 is slidably received in a base 15 which is adapted to support the motor unit in vertical cutting position and to position and guide the cutting tool. Base 15 has a flat undersurface 16 which engages and may be moved over a surface of the work (not shown) during the cutting operations, and is provided with a pair of hand grips 17 on opposite sides thereof by means of which the base 15 may be manually controlled. The base 15 is cylindrical in shape at its upper portion 19 and of a one-piece unitary construction so that concentricity is maintained at all times and with the result that the same may be made with close manufacturing tolerances. As will be understood, the undersurface 16 is also cut away centrally (not shown) so as to permit a cutting tool in the chuck 13 to operate upon the adjacent surface of the workpiece.

The depth of the cut which is made by a cutting tool driven by the motor unit 10 is determined by the vertical positioning of the motor unit 10 in the base 15. The present invention is particularly directed to means for permitting precise adjustment of the height of the motor unit 10 in the base 15 which, at the same time, in an easy and simple manner permits the motor unit 10 to be locked in a selected position or to be entirely freed to make quick depth adjustments or to remove the motor from the base.

The means for accomplishing such positioning of the motor unit 10 in the base 15 includes a pressure member or plug 20 which is slidably received in an opening 21 extending radially through the side of the portion 19 of the base 15. In the preferred embodiment, the plug 20 and opening 21 are made polygonal so as to prevent turning of the plug 20 within the opening 21. The inner surface 22 of the plug 20 is threaded in like manner to that of the motor casing 11 and may be concavely curved so as to conform to the shape of the outer periphery of the casing 11.

Further, in accordance with the invention, the plug 20 is provided with means for adjusting the radial position thereof so that the plug 20 may be moved selectively toward and away from the casing 11 as desired. Moving the plug inwardly against the casing 11 to such a degree, i. e., with such force, that it effectively wedges the casing 11 in the base 15, effectively prevents movement of the motor unit 10 relative to the base 15 and locks it in a selected position. Partial release of the plug 20 sufficient to release the locking pressure on the casing 11 but at the same time keeping the threaded inner surface 22 of plug 20 in engagement with the threads of casing 11 permits the user to make fine adjustment of the height of the motor unit 10 merely by turning the motor unit 10 relative to the base 15, this by reason of the interengaging threads on the plug and casing. In the preferred embodiment, the casing 11 and the inner surface 22 are provided with 16 threads per inch so that an adjustment of exactly 1/64 of an inch may be obtained for each 1/4 turn of the motor in the base. In order to make quick depth adjustments or to remove the motor from the base, the plug 20 is moved outwardly a sufficient distance so that the threaded inner surface 22 no longer engages the threads of casing 11 and thereby frees the motor 10 for such vertical movement as desired. Thus, it is unnecessary to resort to turning the casing 11 in the base 15.

In the event that precise adjustment by turning the motor in the base is not desired, or in order to decrease the costs of manufacturing, the threads of the inner surface 22 of the plug 20 and the threads of casing 11 may be omitted within the scope of the invention. In that event, the plug 20 is either moved inwardly to lock the motor unit 10 in a selected position in the base 15, or is moved outwardly to free the motor unit 10 for depth adjustment or removal, no intermediate position being necessary.

In the preferred embodiment for controlling the plug 20, there is provided a thumb screw 25 which is threadably received in a boss 26 extending around the periphery of opening 21. A connection is made between the thumb screw 25 and the plug 20 by means of a hollow projection 27 on the thumb screw 25 provided with a flange or collar 28 at the inner end, said flange or collar 28 being received within a T-slot 29 in the outer surface of the plug 20. A spring 30 is disposed within the tubular projection 27 to provide a moderate separating force between the plug 20 and the flange or collar 28 while the T-slot 29 is made sufficiently large to permit a slight play in the connection of the thumb screw 25 and the plug 20.

In view of the arrangement described immediately above, the thumb screw 25 may be turned to move the same inwardly or outwardly and thus control the radial position of plug 20 while at the same time permitting the plug 20 to slide in and out without rotating. In other words, the plug 20 is made translatable whereby alignment and engagement of the threads of the surfaces 22 with the threads of the casing 11 is assured at all times. The combination of plug 20 and thumb screw 25 is simple to assemble and disassemble, but even though fully withdrawn from the base 15 the parts are not likely to separate by themselves in view of the light pressure of spring 30. The slight play between plug 20 and thumb screw 25 also prevents binding when the plug 20 is positioned so as to permit adjustment of the height of the motor unit 10 by turning same relative to the base 15.

The threads 31 and 32 of thumb screw 25 and boss 26 respectively are preferably cut with such a lead that the desired positioning of plug 20 can be obtained by very slight turning of the thumb screw 25. For example, in a commercial model of the present invention, these threads 31 and 32 are so arranged that after the thumb screw 25 is turned to the right to lock the motor unit 10 firmly in the base 15 a simple half turn to the left will permit the operator to adjust the height of the motor in the base by turning the motor relative to the base as explained above while one complete turn to the left permits the operator to remove the motor from the base or to make quick depth adjustments merely by manually moving the motor unit 10 which is now free of the base 15.

It thus will be seen that there has been provided in accordance with the invention a novel and improved arrangement for positioning the motor unit 10 in the base 15 which combines the advantages of precise adjustment by turning the motor unit 10 relative to the base 15 or selectively, the locking of the motor unit 10 in an adjusted position in the base 15 or its free removal from the base 15. The manual operation of the mechanism for selectively locking or permitting adjustment of the motor unit 10 in the base 15 is relatively simple and easily performed and can be accomplished in a minimum of time and with a minimum of effort. The construction is simple and economical to fabricate and at the same time the construction is rugged and foolproof in operation and will give desired service over long periods of time without breakdown or malfunctioning.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

We claim as our invention:

1. In a router, a threaded cylindrical motor casing, a base having a central cylindrical opening for receiving said casing, a threaded pressure piece, and means for mounting said pressure piece, for radial movement in the base to a first position for clamping the casing in the base against movement relative thereto, to a second position for permitting vertical adjustment of the casing in the base by turning the casing in the base, and to a third position freeing the casing for axial sliding movement in the base.

2. In a router, a threaded cylindrical motor casing, a unitary base having a central cylindrical opening for receiving said casing, a threaded pressure piece mounted for translation radially into and out of engagement with the periphery of said threaded motor casing, and manually operable means for positioning the pressure piece relative to said casing.

3. In a router, a threaded cylindrical motor casing, a base having a central cylindrical opening for slidably receiving said casing, a threaded pressure piece mounted for translation radially toward and away from the periphery of said threaded motor casing, and manually operable means for selectively translating said pressure piece into a first position of pressure engagement with the casing to clamp same in fixed position in the base, into a second position of engagement permitting the casing to be vertically adjusted by turning same relative to the base, and to a third position permitting free axial sliding movement of the casing in the base.

4. In a router, a threaded cylindrical motor casing, a base having a central cylindrical opening for slidably receiving said casing, a threaded pressure piece mounted in the base for translation radially toward and away from the periphery of said threaded motor casing, and a thumb screw threadably received in the base and secured to the pressure piece for radially positioning same relative to said casing.

5. In a router, a threaded cylindrical motor casing, a base having a central cylindrical opening for slidably receiving said casing and a polygonal opening therethrough disposed radially to said cylindrical opening, a polygonal plug having a T-slot in its outer surface and a threaded interior surface, said plug being translatably and non-rotatably positioned in said polygonal opening, a threaded boss on the casing exterior to said polygonal opening, and a thumb screw rotatably received in said boss having a flanged axial extension rotatably received in said T-slot.

6. In a router, a threaded cylindrical motor casing, a base having a central cylindrical opening for slidably receiving said casing and having a radial opening therein communicating with said cylindrical opening, said radial opening being polygonal at its inner end and being cylindrical and threaded at its outer end, a polygonal plug slidably positioned in said polygonal end of the radial opening having a threaded inner surface for engaging the threaded casing and a T-slot in its outer surface, a thumb screw threadably received in said threaded end of the radial opening, a hollow axial extension on the thumb screw having a collar adapted to be loosely received in said T-slot, and a spring in said hollow extension compressed between the plug and the thumb screw.

JAMES H. GODFREY.
CEDRIC POWERS.

REFERENCES CITED

The following references are of record in the file of this patent:

UNITED STATES PATENTS

| Number | Name | Date |
|---|---|---|
| 347,927 | Esser | Aug. 24, 1886 |
| 443,847 | Ewald | Dec. 30, 1890 |
| 444,484 | Brown | Jan. 13, 1891 |
| 548,498 | Andren | Oct. 22, 1895 |
| 1,721,227 | Manley | July 16, 1929 |
| 1,899,883 | Sacrey | Feb. 28, 1933 |
| 2,311,216 | Duffy | Feb. 16, 1943 |